INVENTORS
Werner W. Berger,
BY Edward S. Gwin, &
William P. Wood
Herbert Furman
ATTORNEY

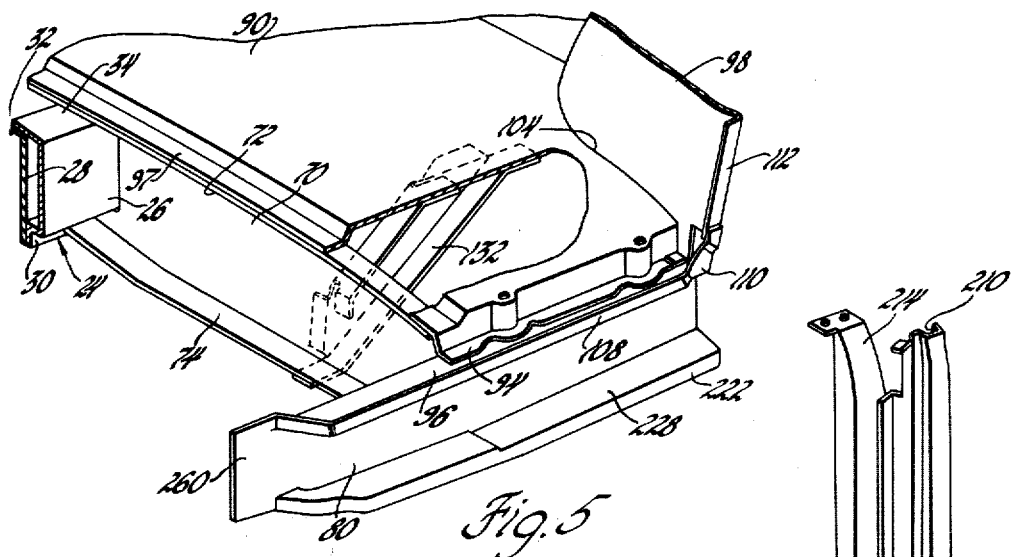
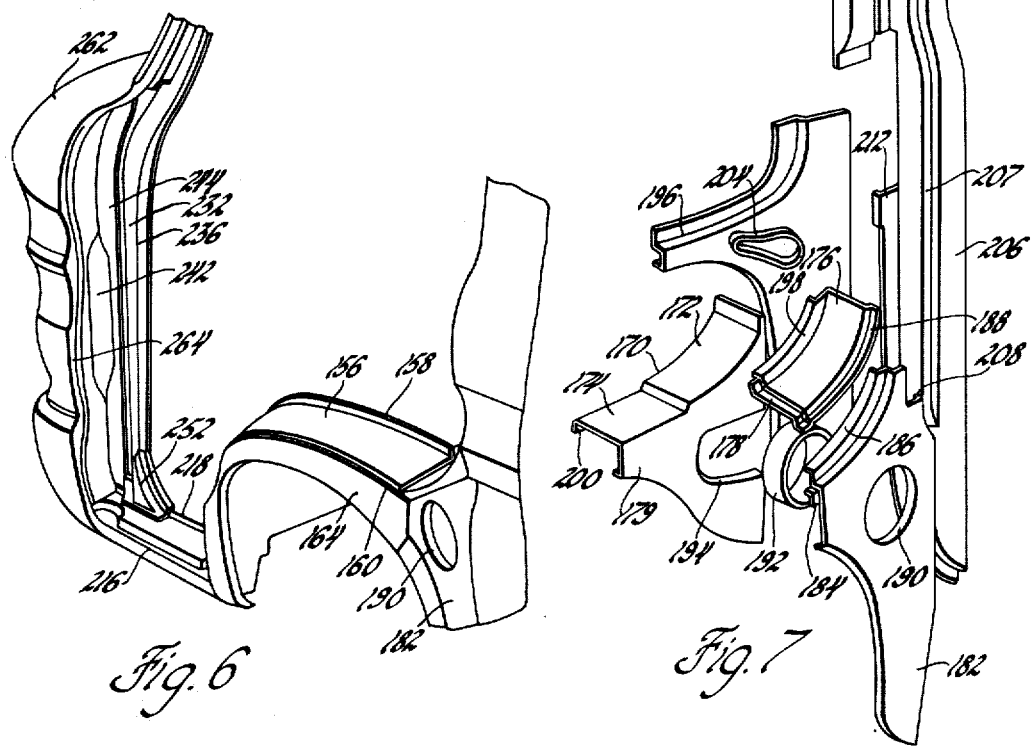

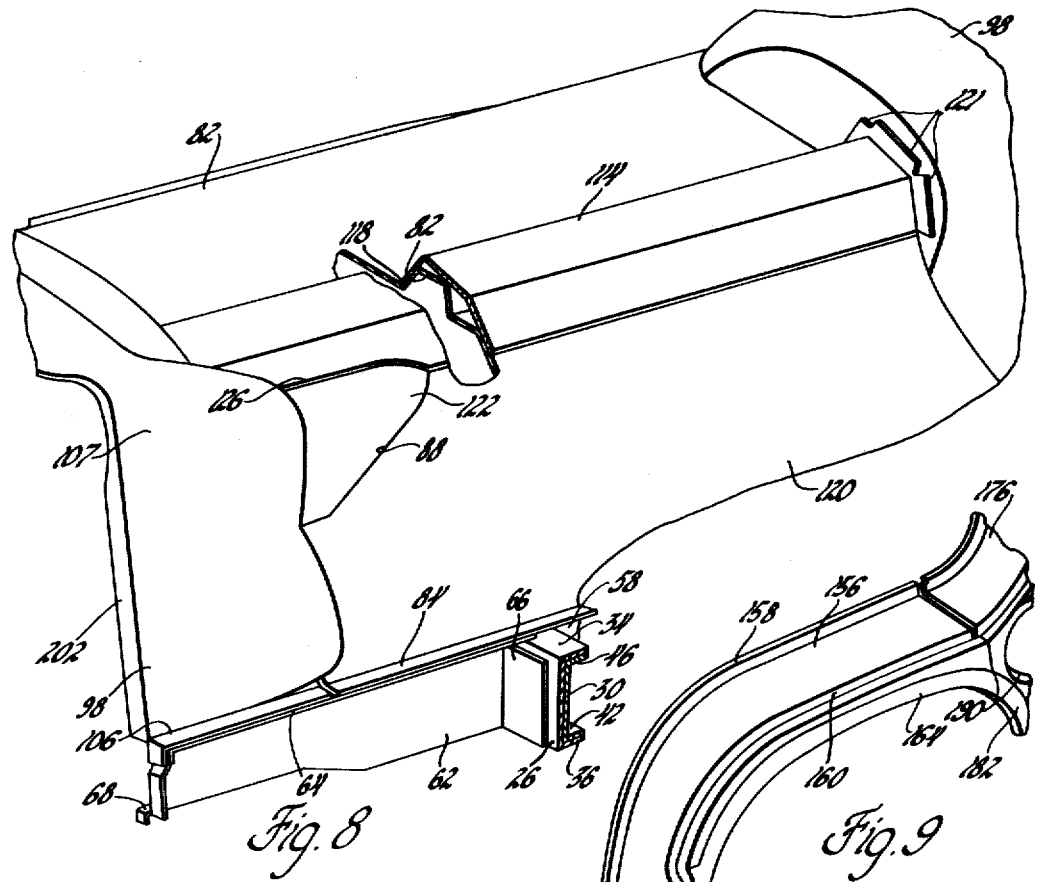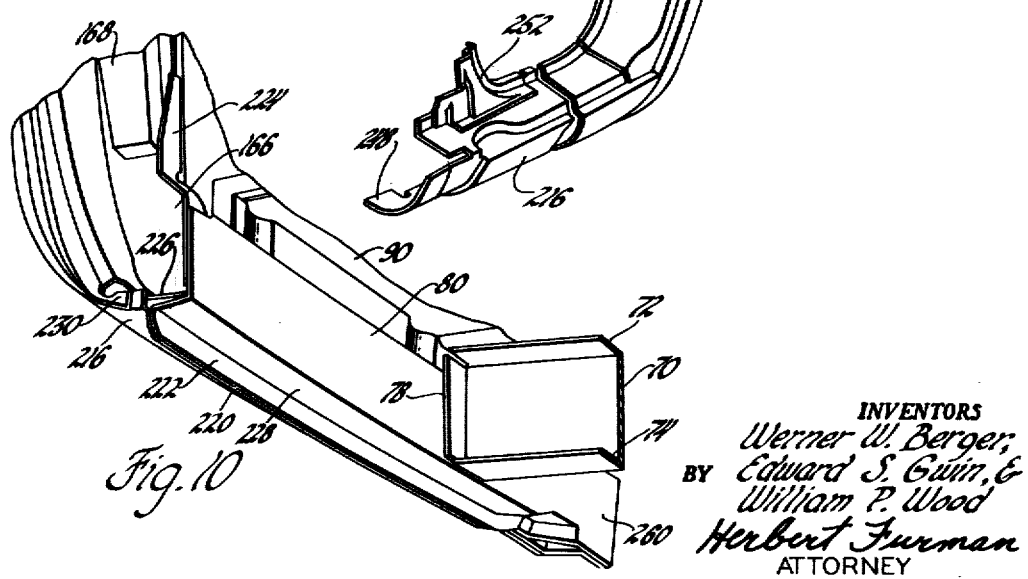

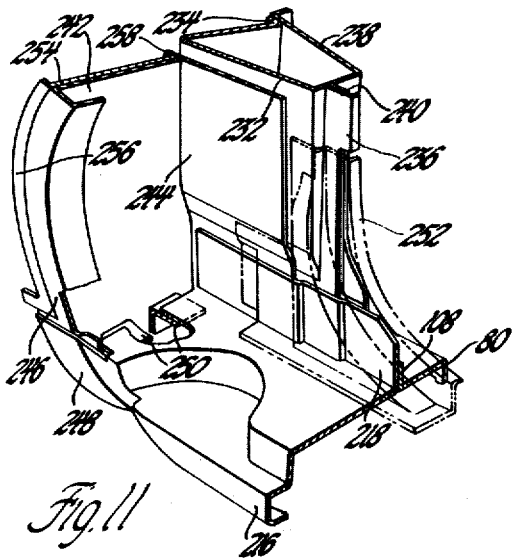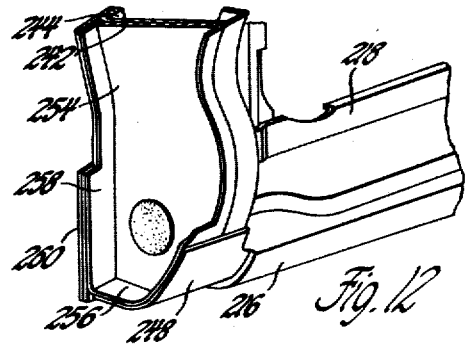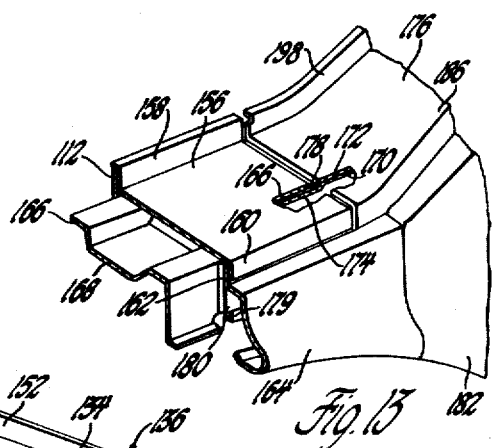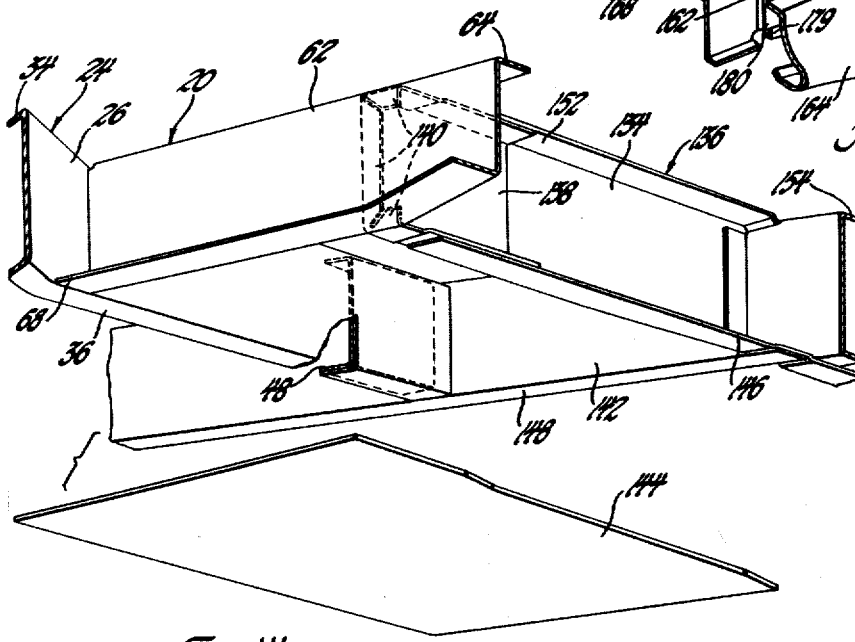

Sept. 10, 1963    W. W. BERGER ET AL    3,103,380
VEHICLE BODY
Filed May 23, 1961    7 Sheets-Sheet 7
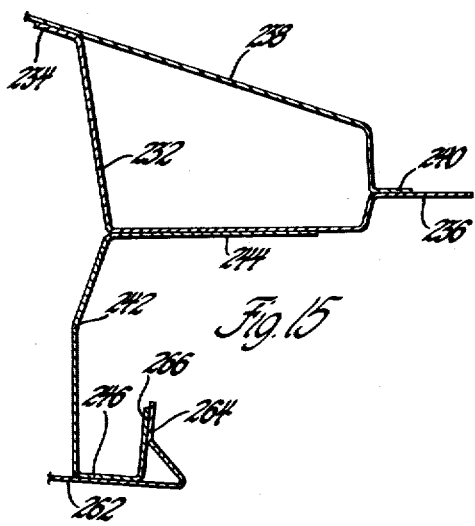
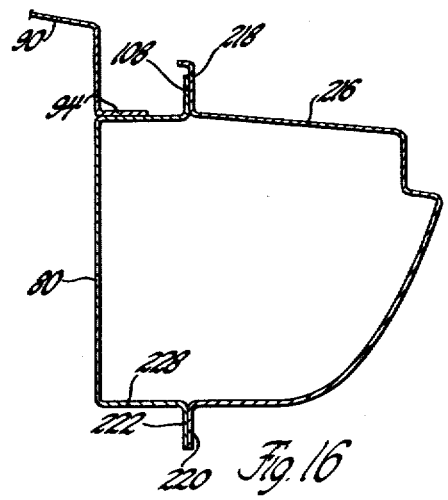
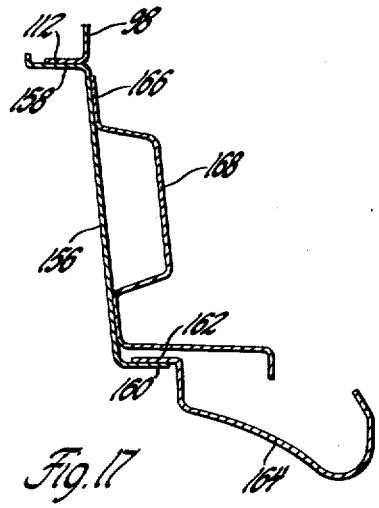
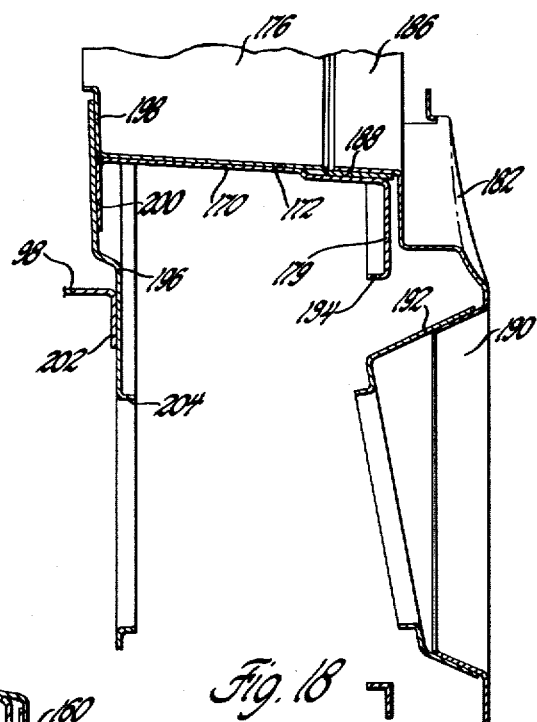
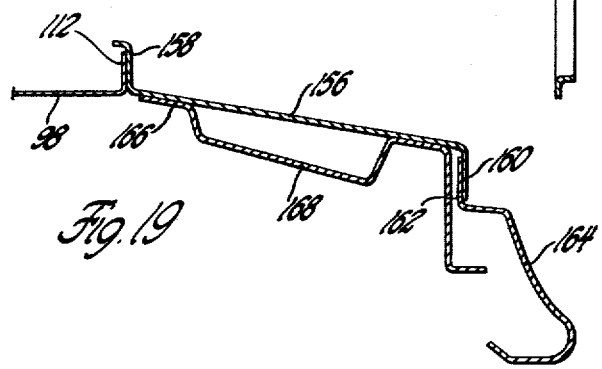
INVENTORS
Werner W. Berger,
BY Edward S. Gunn, &
William P. Wood
Herbert Furman
ATTORNEY

United States Patent Office 3,103,380
Patented Sept. 10, 1963

3,103,380
VEHICLE BODY
Werner W. Berger, Troy, Edward S. Gwin, Birmingham, and William P. Wood, Royal Oak, Mich., assignors to General Motors Corporation, Detroit, Mich., a corporation of Delaware
Filed May 23, 1961, Ser. No. 112,109
4 Claims. (Cl. 296—28)

This invention relates to vehicle bodies and more particularly to vehicle bodies of the integral type wherein the body and chassis are combined into an integral rigid self-sustaining unit.

One of the features of this invention is that it provides an improved integral type body having excellent resistance to torsional bending moments. Another feature of this invention is that it provides an improved front end structure for vehicle bodies of the integral or self-sustaining type. A further feature of this invention is that it provides an improved front end structure for vehicle trucks of the integral or self-sustaining type.

These and other features of the invention will be readily apparent from the following specification and drawings wherein:

FIGURE 5 is an enlarged partially broken away perspective view of a portion of FIGURE 3;

FIGURE 6 is a perspective view of a portion of FIGURE 1 showing the rocker panel and sill construction and door hinge pillar structure;

FIGURE 7 is an exploded view of the parts of the door lock pillar structure of FIGURE 1;

FIGURE 8 is a partially broken away rear perspective view similar to FIGURE 3;

FIGURE 9 is an enlarged view of a portion of FIGURE 6;

FIGURE 10 is a perspective view of a portion of FIGURE 6;

FIGURE 11 is a partially broken away enlarged perspective view of a portion of FIGURE 6;

FIGURE 12 is an enlarged view of a portion of FIGURE 6;

FIG. 13 is an enlarged partially broken away view of a portion of FIGURE 6;

FIG. 14 is an exploded partially broken away view of a portion of FIGURE 1;

FIGURE 15 is an enlarged sectional view taken generally along the plane indicated by line 15—15 of FIGURE 1;

FIGURE 16 is an enlarged sectional view taken along the plane indicated generally by line 16—16 of FIGURE 1;

FIGURE 17 is an enlarged sectional view taken generally along the plane indicated by line 17—17 of FIGURE 1;

FIGURE 18 is an enlarged sectional view taken generally along the plane indicated by line 18—18 of FIGURE 1; and FIGURE 19 is an enlarged sectional view taken generally along the plane indicated by line 19—19 of FIGURE 1.

Figure 1:
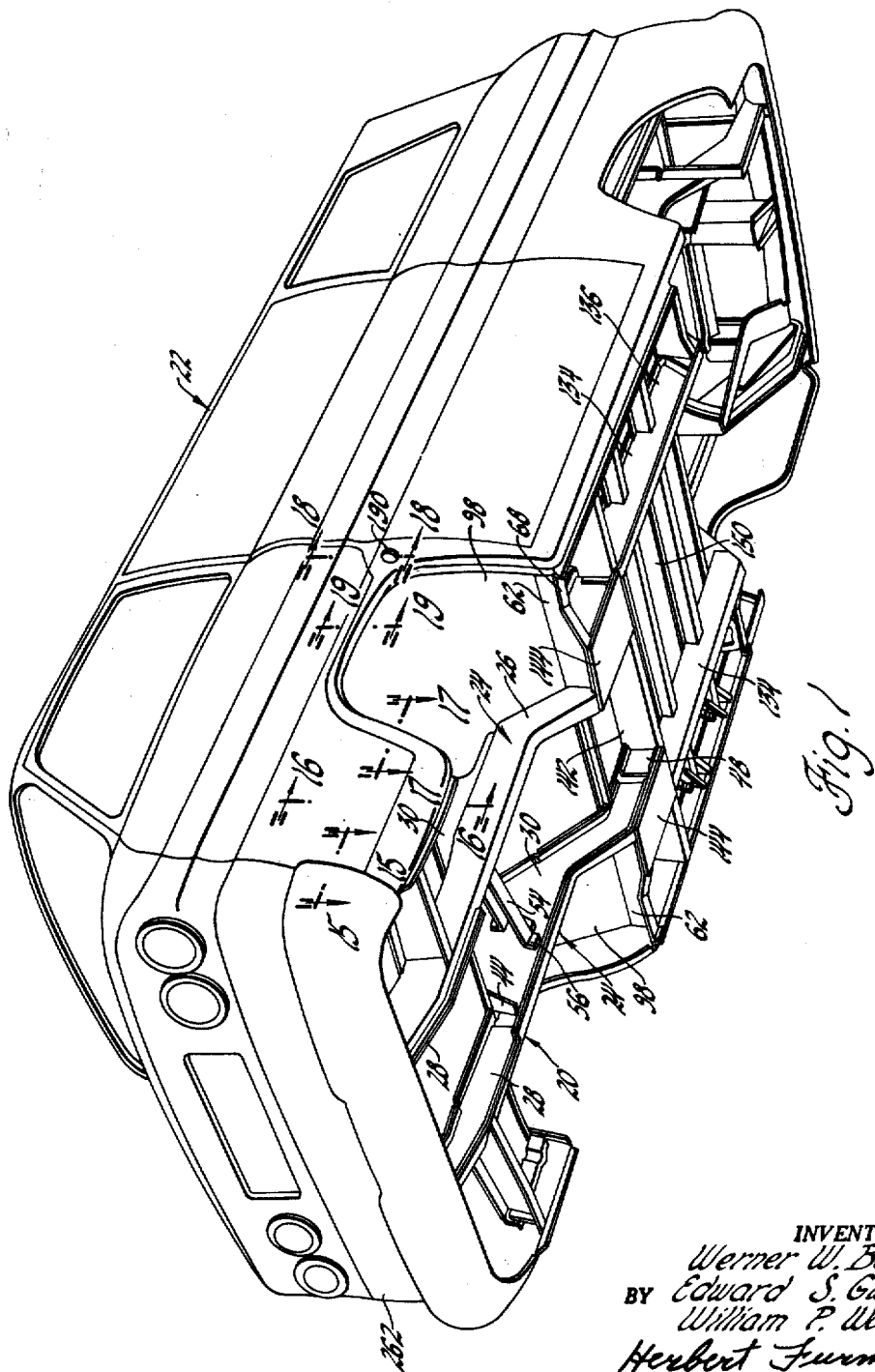
FIGURE 1 is a perspective view of a vehicle truck having an underbody embodying a front end structure according to this invention.

Referring now particularly to FIGURES 1 through 5 and 8 of the drawings, the front underbody structure 20 of body 22 generally includes a pair of longitudinally extending rail structures 24 of like construction. Each rail structure includes an outer channel rail member 26, a front inner rail member 28, and a rear inner rail member 30. The member 28 includes an upper laterally inwardly extending flange 32 which is welded to a like flange 34 of member 26. The front portion of the lower laterally inwardly extending flange 36 of member 26 is bent laterally downwardly and secured to member 28. The rear portion of the flange 36 is secured to a like flange 38 of member 28 formed as a continuation thereof.

Figure 4:
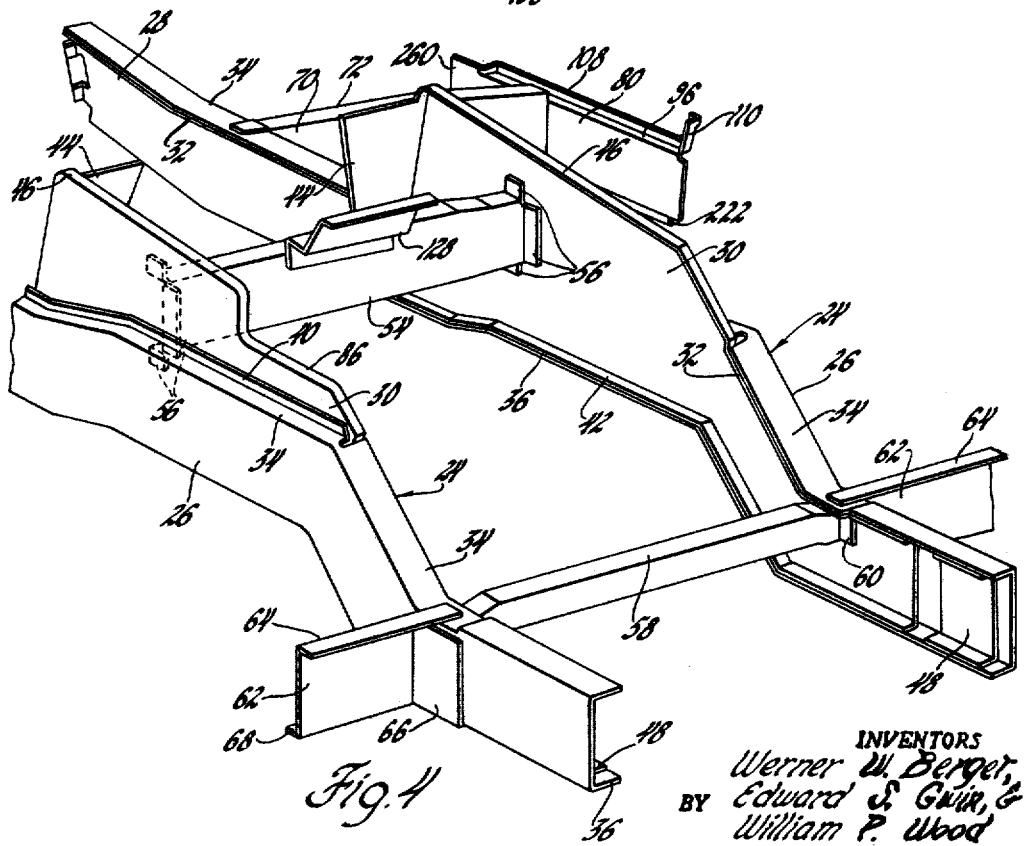
FIGURE 4 is an enlarged perspective view of a portion of FIGURE 3 showing the rail structure thereof.

A portion 40 of the flange 34 of member 26 is bent laterally upwardly to define a cutout receiving member 30, with portion 40 being abutted against and secured to the member 30, as best shown in FIGURE 4. A lower laterally inwardly extending flange 42 of member 30 abuts against and is secured to the flange 36 of member 26, and a front generally vertically disposed laterally inwardly extending flange 44 of member 30 abuts against the front edge of the cutout and merges into an upper laterally inwardly extending flange 46. The rear portion of the flange 46 fits within the flange 34 adjacent the rear end of rail 26, as shown in FIGURE 4, and is secured thereto. A channel shaped reinforcing member 48 fits within and is secured to the rear end of rail member 26.

As best shown in FIGURE 4, the rail structures 24 are interconnected intermediately thereof by a channel cross member 54 which extends between the members 30 and includes a plurality of flanges 56 at each end thereof which abut against and are secured to each member 30. An angle cross member 58 extends between the rearward ends of the members 30 and includes offset ends having lateral flanges 60 which are secured to the members 30, with the ends of the upper leg of the member 58 being secured to the flange 46 of member 30 and to the flange 34. Rear outrigger members 62 include an upper laterally rearwardly extending flange 64, the inner ends of which overlap and are secured to the flanges 34 of members 26, as shown in FIGURE 4. Members 62 also include an inner lateral flange 66 which abuts against and is secured to the outer surface of member 26, and a lower laterally forwardly extending flange 68, the inner end of which is secured to the outer surface of the member 26.

Front channel outrigger members 70 include upper laterally forwardly extending flanges 72, the inner ends of which overlap and are secured to the flanges 34, and lower laterally forwardly extending flanges 74, the inner ends of which overlap and are secured to the flanges 36. The outer ends of the members 70 include a laterally forwardly extending flange 78 which abuts against and is secured to an intermediate portion of the rocker inner panel members 80.

Figure 2:
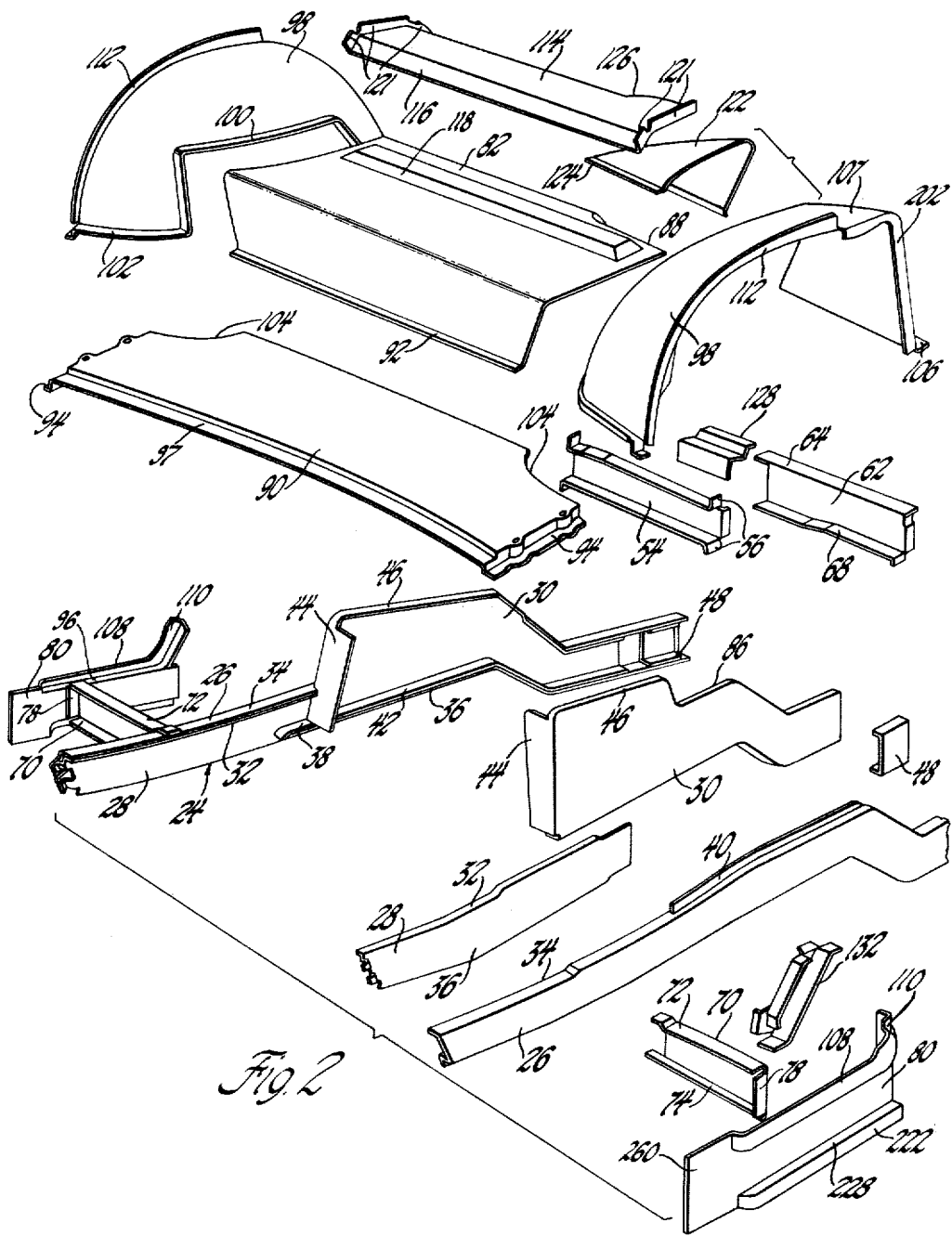
FIGURE 2 is an exploded view of the parts of the front end structure of the underbody shown in FIGURE 1.

A rear floor panel member 82 of generally U-shaped section extends between the members 30 and is secured to the flanges 44 and 46 thereof. Member 82 includes a rear laterally rearwardly extending flange 84 which abuts against and is secured to the upper leg of the member 58, FIGURE 8. It will be noted, FIGURES 2 and 4, that a portion 86 of the left hand rail member 30 is cut out and that a portion 88 of the member, FIGURES 2 and 8, is also cut out, for a purpose to be hereinafter described. The rear edge of a front floor panel member 90 overlaps and is secured to a front lateral flange 92 of the panel member 82. The side edge portions of the member 90 are provided with flanges 94 which bear against and are secured to flanges 96 of the rocker inner panel members 80. The forward flange 97 of member 90 is secured to flanges 34 and 72 of the rail members 26 and outrigger members 70, respectively. Although not shown in the drawings, flange 97 is secured to the rearward edge of the toe pan of the body, while the forward exposed ends of rail structures 24 extend to the front end of the body and provide the support means for the front bumper.

A pair of wheel house members 98 are provided with inner U-shaped openings corresponding to the side openings of the floor panel member 82 and including continuous laterally inwardly extending flanges 100 which fit within and are secured to the side edge portions of the member 82. Members 98 further include lateral flanges 102 which fit underneath and are secured to edge portions 104 of member 90, and flanges 106 which are secured to flanges 64 of members 60, FIGURE 8. It will be noted that the left hand wheel house includes an outwardly embossed portion 107 for a purpose to be hereinafter described. As best shown in FIGURE 5, an outer laterally upwardly extending flange 108 of each of the rocker inner panel members 80 includes a rear upwardly extending portion 110 which overlaps and is secured to a laterally upwardly extending outer flange 112 of the members 98.

A combined channel shaped brace and seat support member 114 includes a forward leg 116 which is secured to a like leg of a channel embossment 118 in the upper wall of the member 82, as best shown in FIGURE 8, with the rear leg of the member 114 bearing against and being secured to the rear wall 120 of the member 82. The ends of member 114 include separated lateral flanges 121 which bear against and are secured to the wheel housings 98.

Figure 3:
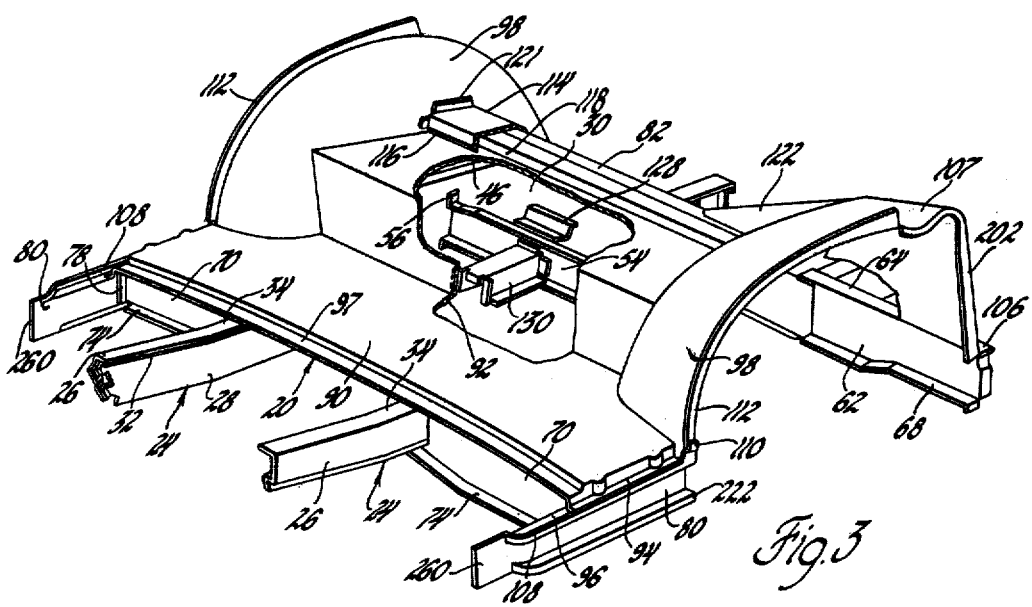
FIGURE 3 is a partially broken away front perspective view of the parts of FIGURE 2 shown in assembled position.

An arch shaped gas tank filler tube member 122 includes a continuous lateral flange 124 which is secured to the edge portion of the cutout 88 of member 82, FIGURE 8. A portion 126 of the member 114 is shaped so as to conform to the member 122 and be secured thereto. Although not shown in the drawings, the open outer end of member 122 is secured to the embossment 107 of the left hand wheel house 98 so as to provide access to the interior of the floor panel member 82 through an opening provided in this embossment. The gas tank for the vehicle is located within the member 82 and is supported by a bracket member 128 which is secured to the member 54, as best shown in FIGURE 4. As shown in FIGURE 3, a brace member 130 of channel-shaped construction includes front and rear flanged edge portions which bear against and are secured to the member 54 and the front wall of the panel member 82 so as to brace the member 54 and also the bracket 128.

As shown in FIGURE 5, a channel brace 132 is provided for each of the front outrigger members 70, with the upper flanged end of this brace being secured to the floor panel member 90 and the lower flanged end of this brace being secured to the outrigger member 70.

As shown in FIGURES 1 and 14, the rail structures 24 of the front underbody structure 20 are spaced laterally inwardly of the rail structures 134 of the intermediate underbody structure 136. Insert bracket members 138 provided at the forward ends of the structures 134 include a plurality of lateral flanges 140 at their forward ends which abut against and are secured to the members 62. The rear ends of the members 26 of rail structures 24 abut against and are welded to a brace member 142 which extends between the rail structures 134. A torque plate 144 covers the lower part of the opening defined by members 26, 134, 62, and 142, being secured to the respective flanges 36, 146, 68, and 148 thereof. A floor panel member 150 of the intermediate underbody structure covers the upper part of this opening being secured to the flange 152 of member 134, the flange 154 of member 42, the flange 34 of member 26, the flange 84 of member 82 and the flanges 106 of members 98. Thus, a "torque box" is provided between the front and intermediate underbody structures. The use of the "torque boxes" allows the rail structures 24 and 134 to be generally straight or extend generally linear in directions longitudinal of the body. Thus, arcuately shaped rail structures are avoided. The "torque boxes" increase the ease of assembly and further allow for adjustability between the forward ends of the rail structure 134 and the rearward ends of the rail structure 24 so as to compensate for manufacturing tolerances.

Referring now to FIGURES 6, 7, 9, 10, 13 and 17 through 19, inclusive, sill members 156 include inner laterally upwardly extending flanges 158 which are welded to flanges 112 of wheel houses 98. Outer laterally downwardly extending flanges 160 of member 156 overlap and are secured to flanges 162 of outer sill members 164. A reinforcing member 166 welded to the underside of each member 156 includes a downwardly embossed rectangularly shaped portion 168 intermediate the ends thereof which is spaced from the undersurface of the member 156.

As best shown in FIGURES 7, 13 and 18, inner pillar members 170 include upper walls 172, the forward portions 174 of which are offset. Outer pillar members 176 seat on wall 172 and include forward offset portions 178 which are of lesser extent than wall portions 174. Offset portions 178 fit underneath and are secured to the rear ends of members 156 in closely spaced juxtaposed relationship to the rear ends of members 166, as shown in FIGURE 13. The offset portions 174 of members 172 fit within the rear ends of members 156 and 166, being secured to the rear ends of the members 166, with members 172 including an outer depending flange 179 secured to an offset flange portion 180 of member 166. Pillar members 182 include offset flange portions 184 which fit within the rear ends of member 164 and are secured thereto. Flanges 186 of members 182 overlap offset flanges 188 of members 176 and are secured thereto and to the upper wall portions 172 of members 170. The left hand member 182 is provided with an inwardly flanged opening 190 which is secured to a bell member 192, as best shown in FIGURE 18. Member 192 opens to an inwardly flanged slot 194 provided in the left hand member 170. Pillar inner members 196 are secured to the flanges 198 of member 176 and the flanges 200 of members 170, and are further secured to laterally downwardly extending flanges 202 of the wheel house members 98. The left hand member 196 is provided with an outwardly flanged opening 204 which opens to the embossment 107 of wheel house member 98.

Channel shaped pillar outer members 206 include rabbets 207, the rear walls of which seat and are secured to lateral flanges 208 of the members 182. The rear legs 210 of members 206 are secured to the rear edges of members 196, and flanges 212 of members 206 seat against and are secured to the outer faces of the members 196. A pillar inner member 214 of generally channel shaped construction fits within each member 206, above members 196, and is secured thereto.

Rocker outer panel members 216 include upper and lower laterally extending flanges 218 and 220 which are respectively secured to the flanges 108 and 222 of the rocker inner panel members 80. As best shown in FIGURE 10, the forward ends of the members 166 close the rear ends of the box structure defined by members 80 and 216, and include lateral flanges 224 secured to the member 80 and lateral flanges 226 secured to the flanges 228 thereof. The rear ends of the rocker outer panel members 216 are bent laterally upwardly, as shown in FIGURE 10, and are welded to flanges 230 of members 164.

Referring now to FIGURES 6, 9, 11, and 15, hinge pillar inner members 232 include flanges 234 and 236 secured to the toe pan 238 and flange 240 thereof, respectively. Generally L-shaped pillar outer members 242 have the inner legs 244 thereof secured to members 232. Legs 244 extend downwardly between flanges 218 and 108 and are secured thereto. The outer legs of members 242 have the lower portions thereof arcuately shaped and including flanges 246 which fit within and are secured to arcuately shaped offset portions 248 at the forward ends of the rocker outer panel members 216. Angle tabs 250 interconnect the upper walls of members 216 and the outer legs of members 242. Brace members 252 are secured to members 232 and the flanges 236 thereof and also to the flanges 218 so as to brace the hinge pillars. Closure plates 254 seat against the outer legs of members 242 and include flanges 256 which are secured to the portions 248 of members 216. Members 254 also include flanges 258 which seat against and are secured to the flanges 234 of members 232. Further, as shown in FIGURE 9, the rocker inner panels members 80 include flat extensions 260 which are also secured to the lower portions of the flanges 234 opposite the lower portions of the flanges 258. As indicated in FIGURE 15, the front end outer body panel 262 overlaps and is secured to the flanges 246 of members 242, with the panel 262 including flanges 264 which are secured to flanges 266, extending laterally to the flanges 246.

Thus, this invention provides a new and improved integral type body which is particularly adapted for use on vehicle trucks.

We claim:

1. In a vehicle body, the combination comprising, a pair of laterally spaced longitudinally extending rail structures, each including an upwardly offset portion joined to a lower end portion thereof by a generally vertically extending portion, a first floor panel structure extending between said rail structures, said floor panel structure seating on said upwardly offset portion and said vertically extending portion of each rail structure and being secured thereto, a second floor panel structure extending between said rail structures, said second floor panel structure being secured to said lower end portion of each of said rail structures and to said first floor panel structure and including end portions extending laterally outwardly of said end portions of each of said rail structures, a wheel house structure adapted to receive and encircle a vehicle wheel and located laterally outwardly of each of said rail structures and of said first floor panel structure and being secured to said first floor panel structure and to said end portions of said second floor panel structure, said first floor panel structure including an opening at one edge portion thereof adjacent one of said wheel house structures, and an arched cover member secured to said one wheel house structure and to said first floor panel structure adjacent the edge portion of said opening therein.

2. In a vehicle body, the combination comprising, a pair of laterally spaced longitudinally extending rail structures, each including an upwardly offset portion joined to lower end portions thereof by generally vertically extending portions, a first floor panel structure extending laterally between said rail structures, said floor panel structure seating on said upwardly offset portions and said vertically extending portions of each rail structure and being secured thereto, a second floor panel structure extending laterally between said rail structures, said second floor panel structure being secured to one of said lower end portions of each of said rail structures and to said first floor panel structure and including end portions extending laterally outwardly of said one lower end portion of each of said rail structures, a front wheel house structure adapted to receive and enclose a steerable vehicle wheel, said front wheelhouse structure being located laterally outwardly of each of said rail structures and of said first floor panel structure and including a generally U-shaper inner edge portion, the longitudinal portion of said inner edge portion being secured to said first floor panel structure and one lateral edge portion of said inner edge portion being secured to said end portions of said second floor panel structure, and an outrigger member secured to the other of said lower end portions of each of said rail structures, said outrigger members extending laterally from said rail structures and being secured to the other of said lateral edge portion of said inner edge portion of said wheel house structures.

3. In a vehicle body, the combination comprising, a pair of laterally spaced longitudinally extending rail structures, each including an upwardly offset portion joined to lower end portions thereof by generally vertically extending portions, a first floor panel structure extending laterally between said rail structures, said floor panel structure seating on said upwardly offset portion and said vertically extending portions of each rail structure and being secured thereto, a second floor panel structure extending laterally between said rail structures, said second floor panel structure being secured to one of said lower end portions of each of said rail structures and to said first panel structure and including end portions extending laterally outwardly of said one lower end portions of each of said rail structures, a wheel house structure located laterally outwardly of each of said rail structures and said first floor panel structure and including a longitudinal inner edge portion secured to said first floor panel structure and one lateral inner edge portion secured to one lateral edge portion of said end portions of said second floor panel structure, outrigger brace members secured to the other of said lower end portions of said rail structures and to the other lateral inner edge portions of said wheel house structures, second outrigger brace members secured to the one lower end portions of said rail structures and to the other lateral edge portion of said second floor panel structure end portions, and brace members interconnecting said second outrigger brace members the longitudinal edge portions of said second floor panel end portions and said wheel house structures.

4. In a vehicle body, sill structure comprising, in combination, a sill member secured to a door pillar structure, said sill member and door pillar structure defining an arched wheelhouse opening and a portion of a door opening, a rocker outer panel member secured to one end of said sill member, a rocker inner panel member secured to said outer panel member and providing a hollow box like structure therewith to define the other portion of said door opening, a brace member secured to one side of said sill member and including an end portion secured to one end of each of said rocker panel members to close one end of said hollow box like structure, and a pillar structure secured to said rocker panel members and closing the other end of said hollow box like structure.

References Cited in the file of this patent

UNITED STATES PATENTS

| | | |
|---|---|---|
| 2,018,443 | Fageol | Oct. 22, 1935 |
| 2,172,831 | Carlson | Sept. 12, 1939 |
| 2,233,181 | Quartullo | Feb. 25, 1941 |
| 2,662,793 | Lindsay | Dec. 15, 1953 |
| 2,864,647 | Chesna et al. | Dec. 16, 1958 |
| 2,954,998 | Kushler et al. | Oct. 4, 1960 |

UNITED STATES PATENT OFFICE
CERTIFICATE OF CORRECTION

Patent No. 3,103,380                            September 10, 1963

Werner W. Berger et al.

It is hereby certified that error appears in the above numbered patent requiring correction and that the said Letters Patent should read as corrected below.

Column 6, line 2, for "U-shaper" read -- U-shaped --; line 23, after "first" insert -- floor --.

Signed and sealed this 3rd day of March 1964.

(SEAL)
Attest:

ERNEST W. SWIDER                                 EDWIN L. REYNOLDS

Attesting Officer                                     Acting Commissioner of Patents